US010688626B2

(12) United States Patent
Freund

(10) Patent No.: US 10,688,626 B2
(45) Date of Patent: Jun. 23, 2020

(54) SENSOR FOR POWER CLAMP

(71) Applicant: Pepperl+Fuchs GmbH, Mannheim (DE)

(72) Inventor: Thomas Freund, Mannheim (DE)

(73) Assignee: Pepperl+Fuchs GmbH, Mannheim (DE)

( * ) Notice: Subject to any disclaimer, the term of this patent is extended or adjusted under 35 U.S.C. 154(b) by 398 days.

(21) Appl. No.: 15/312,860

(22) PCT Filed: May 21, 2015

(86) PCT No.: PCT/EP2015/061289
§ 371 (c)(1),
(2) Date: Nov. 21, 2016

(87) PCT Pub. No.: WO2015/177291
PCT Pub. Date: Nov. 26, 2015

(65) Prior Publication Data
US 2017/0182635 A1 Jun. 29, 2017

(30) Foreign Application Priority Data
May 22, 2014 (DE) ........................ 10 2014 107 267

(51) Int. Cl.
*B23Q 3/08* (2006.01)
*B25B 5/12* (2006.01)
(Continued)

(52) U.S. Cl.
CPC ................ *B25B 5/122* (2013.01); *B25B 5/16* (2013.01); *F15B 11/08* (2013.01); *F15B 19/005* (2013.01); *F15B 21/08* (2013.01)

(58) Field of Classification Search
USPC .............................. 269/32, 28, 30, 228, 903
See application file for complete search history.

(56) References Cited

U.S. PATENT DOCUMENTS 5,823,519 A 10/1998 Tunkers
5,845,897 A 12/1998 Tunkers
(Continued)

FOREIGN PATENT DOCUMENTS

DE 90 16 781.3 U 4/1992
DE 93 11 132 U1 9/1993
(Continued)

OTHER PUBLICATIONS

International Search Report of PCT/EP2015/061289, dated Sep. 24, 2015.

(Continued)

*Primary Examiner* — Joseph J Hail
*Assistant Examiner* — Shantese L McDonald
(74) *Attorney, Agent, or Firm* — Collard & Roe, P.C.

(57) ABSTRACT

A toggle clamping device for building vehicle bodies has a clamping head and a cylinder, which adjoins the cylinder-side end of the clamping head in axial extension and the piston rod of which passes axially through the cylinder and a cavity of the clamping head, a toggle clamping arrangement being fastened to the free end of the piston rod, the toggle clamping arrangement being coupled to a clamping arm, and an opening being provided in the housing, and a cavity being provided therein for the mounting of a detection device for detecting the end positions of the clamping head, and wherein the detection device is formed as an exchangeable part, a "cassette". For simple exchange of the cassette, the detection device is made up of a retainer and at least one sensor carrier, and the retainer is connected to the at least one sensor carrier such that the retainer can pivot about a pivot axis, the pivot axis being oriented transversely to the direction of the piston rod.

10 Claims, 5 Drawing Sheets

Figure 1:
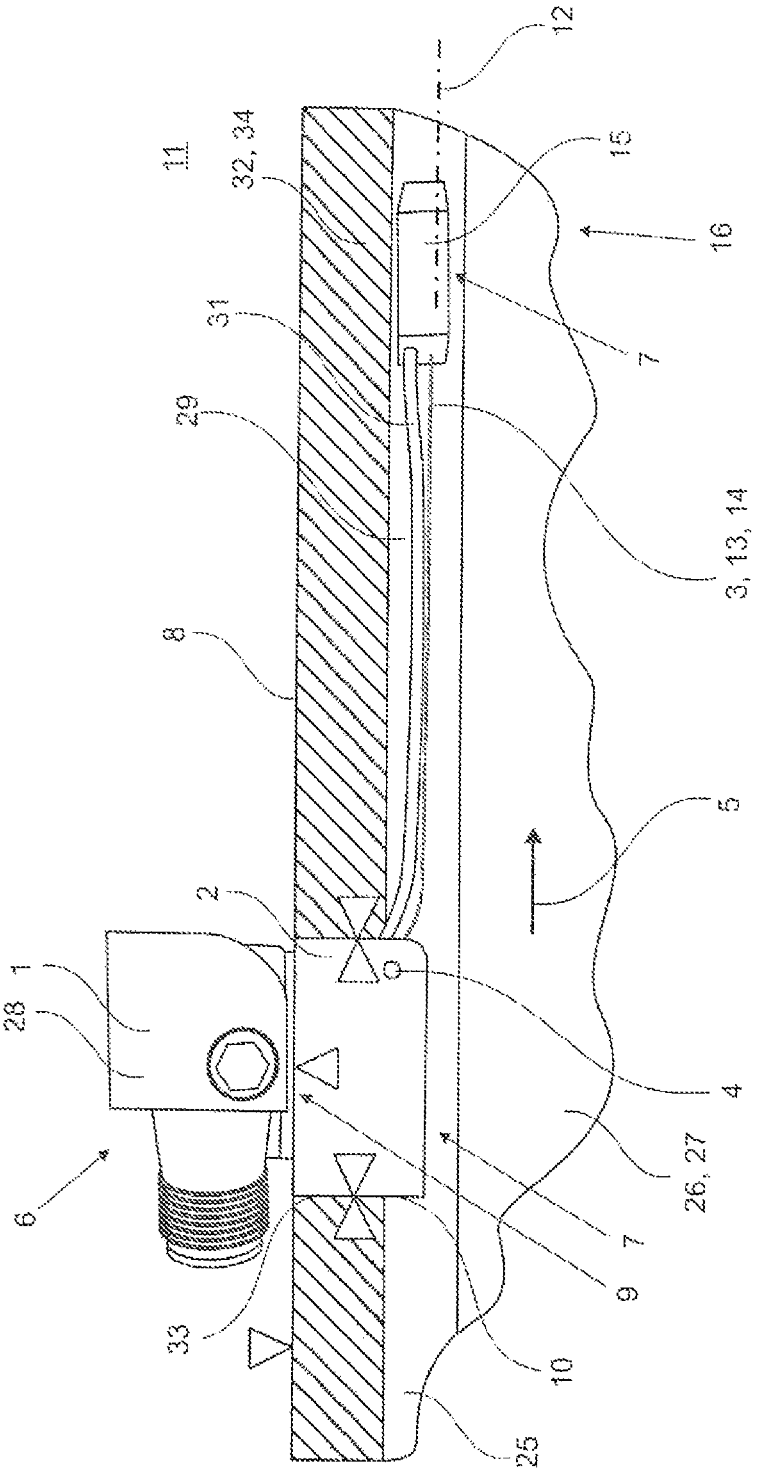

(51) Int. Cl.

| | |
|---|---|
| ***B25B 5/16*** | (2006.01) |
| ***F15B 11/08*** | (2006.01) |
| ***F15B 19/00*** | (2006.01) |
| ***F15B 21/08*** | (2006.01) |

(56) References Cited

U.S. PATENT DOCUMENTS

| | | | | |
|---|---|---|---|---|
| 6,220,588 | B1 * | 4/2001 | Tunkers .................. | B25B 5/061<br>269/32 |
| 6,429,786 | B1 | 8/2002 | Bansemir et al. | |
| 2002/0149147 | A1 * | 10/2002 | Schauss .................. | B25B 5/122<br>269/228 |
| 2004/0041324 | A1 | 3/2004 | Fukui | |
| 2006/0197270 | A1 * | 9/2006 | Migliori .................... | B25B 5/12<br>269/228 |

FOREIGN PATENT DOCUMENTS

| | | | |
|---|---|---|---|
| DE | 295 02 184 | U1 | 3/1995 |
| DE | 196 16 441 | C1 | 4/1998 |
| DE | 196 53 291 | C1 | 4/1998 |
| DE | 198 24 579 | C1 | 6/1999 |
| DE | 20 2008 012622 | U1 | 12/2008 |
| EP | 0 679 353 | B1 | 4/1997 |
| EP | 0 778 107 | A1 | 6/1997 |
| EP | 0 803 331 | B1 | 10/1997 |
| EP | 0 962 285 | A2 | 12/1999 |
| EP | 1 306 168 | A2 | 5/2003 |
| EP | 1 878 539 | A1 | 1/2008 |

OTHER PUBLICATIONS

International Preliminary Report on Patentability and Written Opinion of the International Searching Authority with Notification of Transmittal in PCT/EP2015/061289, dated Dec. 1, 2016.

* cited by examiner

SENSOR FOR POWER CLAMP

CROSS REFERENCE TO RELATED APPLICATIONS

This application is the National Stage of PCT/EP2015/061289 filed on May 21, 2015, which claims priority under 35 U.S.C. § 119 of German Application No. 10 2014 107 267.7 filed on May 22, 2014, the disclosure of which is incorporated by reference. The international application under PCT article 21(2) was not published in English.

The invention relates to a toggle clamping apparatus for vehicle body construction, having a clamping head and having a cylinder that follows the cylinder-side end of the clamping head in an axial extension, the piston rod of which passes axially through the cylinder and a cavity of the clamping head, wherein a toggle joint arrangement is attached to the free end of the piston rod, which arrangement is coupled with a clamping arm, and wherein an opening is provided in the housing, and a cavity for installation of a detection device for detection of the end positions of the clamping head is provided therein, and wherein the detection device is structured as an exchangeable part, called a cassette.

Furthermore, the invention relates to a detection unit, particularly for detection of the end positions of a clamping head, preferably for installation in a toggle clamping apparatus for vehicle body construction, having end switches or positioners in the form of micro-switches, inductive switches, pneumatic switches or sensors, which are integrated into a space of the clamping head that is accessible through an opening, and are attached to a retainer that forms the cover for the opening, as a detection cassette that is exchangeable as a whole.

Finally, the invention relates to a method for installation of a detection unit through an opening of a housing, for detection of parts that move translationally in the housing, particularly for a toggle clamping apparatus, preferably for use in vehicle body construction in the motor vehicle industry.

Toggle clamping apparatuses are used in vehicle body construction to hold components in sheet-metal form, in order to then connect these permanently by means of spot welding, gluing, clinching or the like. The great holding and pressing forces achieved by means of the toggle joint thereby allow secure fixation. In general, such toggle clamping apparatuses consist of a clamping head and a piston/cylinder unit that follows the head axially, the unit consisting of a cylinder and a piston to which pressure medium pressure, particularly by means of compressed air, is applied alternately on both sides, which piston is provided with a piston rod that partly passes through the clamping head and carries the toggle joint arrangement at its end, by way of a joint, which arrangement is connected with a clamping arm that interacts with a jaw or the like, so that the components to be held between the jaw and the clamping arm can be firmly clamped in place. In general, such toggle clamping apparatuses are incorporated into a sequencing control, so that the production lines can be automated to a great extent.

A toggle clamping apparatus is previously known from DE 198 24 579 C1, for example, for use in vehicle body construction in the motor vehicle industry, having a clamping head and a cylinder that follows it in an axial extension, in which cylinder a piston to which pressure medium pressure is to be applied, also alternately on both sides, is guided to be longitudinally displaceable, torque-proof, and to form a seal, and the housing is closed off to form a seal, having end position detection apparatuses for the piston, in the form of contact-free sensors, for example inductive sensors or the like. However, the adjustment apparatus can also be configured as a linear motor, an air motor, a hydromotor, an electrical spindle motor or a piston/cylinder unit to which pressure medium pressure is applied alternately on both sides. In the previously described toggle clamping apparatus, the cylinder end position, the opening angle of a clamping arm, the end position detection, and, if applicable, end position damping can be adjusted simultaneously and jointly by way of a setting element. This is advantageous if it should turn out, for example, that tolerances cannot be adhered to precisely or if contours of the parts to be clamped change. This is an advantage that should not be underestimated, because then, no shut-down times in production lines of the motor vehicle industry come about, with which shut-down times high costs for retooling times, etc., are otherwise connected. Furthermore, the setting element allows the desired sensitive adjustment, in each instance, under operating conditions. Because the setting element can be disposed at a location that does not represent a hindrance, for example on the cylinder bottom, the outside contour of the toggle clamping apparatus is also not influenced negatively, so that its ability to be installed on all sides, from four sides, is maintained. Then, no openings on the cylinder, on the clamping head or the like have to be provided, either, for example in order to place sensors. Instead, in this embodiment it is possible to move all electrical lines, sensors, and damping elements into the toggle clamping apparatus, for example into the cylinder and/or the clamping head.

A sensor system and evaluation system that can be used for this purpose is described in DE C1 196 53 291.

DE 196 16 441 C1 also relates to a toggle clamping apparatus for vehicle body construction, having a clamping head that is rectangular in cross-section, is guided orthogonal to the longitudinal axis of the piston rod, and is composed of two housing parts, and having a cylinder that follows the cylinder-side end of the clamping head in an axial extension, in which cylinder a piston to which pressure medium pressure, particularly compressed air, is to be applied, is guided so as to be longitudinally displaceable and forming a seal. At the free end of the piston rod, a toggle joint arrangement is attached, which is coupled with a clamping arm, having end switches or positioners in the form of micro-switches, inductive switches, pneumatic switches or sensors, which are integrated into a space of the clamping head, wherein the switches are adjustable relative to one another and are disposed and attached on a retainer that forms the cover for the same, as a detection cassette that is exchangeable, as a whole, in the form of a board, in the region of a slot in the axial direction of the clamping head, wherein the detection cassette has a "T-shaped" form in a top view, having an attachment rail and a flange, which is followed by a profile that extends parallel to the longitudinal axis of the piston rod with its longitudinal axis. The detection cassette is inserted from the rear side of the housing of the clamping head, through a narrow slot that extends in the direction of the longitudinal axis of the piston rod and maintaining the installation possibility of the toggle clamping apparatus from all four sides, particularly also the rear side, in such a manner that the profile seals off the slot toward the outside, in as join-sealed a manner as possible.

Further toggle clamping apparatuses for use in vehicle body construction in the motor vehicle industry, having a clamping head and a cylinder that follows it in an axial extension, are known from EP 0 778 107 A1, EP 0 962 285 A2, EP 0 769 353 B1, and US 20040041324 A1.

A toggle clamping apparatus, particularly for use in vehicle body construction of the motor vehicle industry, is previously known from the German utility model 295 02 184 U1; it has a clamping head and a cylinder that follows it, in which a piston to which pressure medium pressure, particularly by means of compressed air, is alternately to be applied on both sides, for example, is guided in longitudinally displaceable and sealed manner.

Finally, a toggle clamping apparatus for vehicle body construction, having a clamping head that is rectangular in a cross-section placed orthogonal to the longitudinal axis of the piston rod, which head is composed of two housing parts, and having a cylinder that follows the cylinder-side end of the clamping head in an axial extension, in which cylinder a piston to which pressure medium pressure, particularly by means of compressed air, is to be applied alternately on both sides, is guided in longitudinally displaceable and sealed manner, which piston passes axially through the cylinder and a cavity of the clamping head with its piston rod, is known from EP 0 803 331 B1 which is the point of departure.

A toggle joint arrangement is attached to the free end of the piston rod, which arrangement is coupled with a clamping arm, having end switches or positioners in the form of micro-switches, inductive switches, pneumatic switches or sensors, which are integrated into a space of the clamping head.

The switches are adjustable relative to one another and are attached on a retainer that forms a cover for the same, as a detection cassette in the form of a board, which is exchangeable as a whole and is disposed in the region of a slot in the axial direction of the clamping head.

In a top view, the detection cassette has "T"-shaped form having an attachment rail and a flange, which is followed by a profile that extends parallel to the longitudinal axis of the piston rod with its longitudinal axis.

Another design of a clamping apparatus is previously known from DE-U-90 16 781.3, having an adjustment assembly, a clamping arm, end position detection devices, and a drive adjustment rod, with which the clamping arm can be pivoted, directly or indirectly, between the end positions that are predetermined by the end position detection elements. The end position detection elements are disposed in a separate housing, releasably connected with the clamping apparatus, next to an adjustable sensor rod provided with positioners and axially guided in this housing, which rod extends parallel to a housing connection surface and projects cut of the housing with its upper end. An axially fixed drive traverse is disposed between the housing and the upper end and the adjustment rod. The end position detection elements are disposed in the housing so as to be adjustable with reference to the positioner.

It is a disadvantage of the proposed solutions that relatively large and long slots are required for installation of the end position detection apparatuses, or that replacement of the end position detection apparatuses is only possible after partial disassembly of the cylinder, wherein replacement of defective switches and their installation is also very time-consuming.

There is therefore an urgent need for end position detection apparatuses that can be installed conveniently and simply, can be installed easily and above all quickly even under tight spatial conditions, and have the shortest possible join lengths, in order to protect the interior of the toggle clamping apparatuses from the rough conditions of the installation surroundings.

This task is accomplished by means of the characteristics described herein.

Further advantageous embodiments of the invention are the object of the dependent claims, in each instance. These can be combined with one another in a technologically reasonable manner. The description, particularly in connection with the drawing, additionally characterizes and specifies the invention.

[A1] The task is accomplished by means of a toggle clamping apparatus for vehicle body construction, having a clamping head and having a cylinder that follows the cylinder-side end of the clamping head in an axial extension, the piston rod of which passes axially through the cylinder and a cavity of the clamping head, wherein a toggle joint arrangement is attached to the free end of the piston rod, which arrangement is coupled with a clamping arm, and wherein an opening is provided in the housing, and a cavity for installation of a detection device for detection of the end positions of the clamping head is provided in the housing, and wherein the detection device is structured as an exchangeable part, called a cassette, in that the detection device consists of a retainer and at least one sensor carrier, and the retainer is connected with the at least one sensor carrier so as to pivot about a pivot axis, wherein the pivot axis is oriented transverse to the direction of the piston rod. By means of the switchable connection of sensor carrier and holder, it is possible to introduce the detection unit into the housing of a toggle clamping apparatus even through a small opening. By means of the smaller opening, the length of required joins is also reduced, so that dirt and water cannot penetrate into the housing of the toggle clamping apparatus in the region of the detection unit. The long slots for the detection unit that are otherwise usual can be advantageously eliminated. Toggle clamping apparatuses that work in the field can also be retrofitted with the detection unit according to the invention, so that the slots that are necessary for known cassette embodiments can be closed.

[A2] The task is also accomplished by a detection unit, particularly for detection of the end positions of a clamping head, preferably for installation into a toggle clamping apparatus for vehicle body construction, having end switches or positioners in the form of micro-switches, inductive switches, pneumatic switches or sensors, which are integrated into a space of the clamping head that is accessible through an opening, and are attached to a retainer that forms the cover for the opening, as a detection cassette that is exchangeable as a whole, if the retainer is connected with at least one sensor carrier that is mounted so as to pivot about a pivot axis, wherein the pivot axis is oriented parallel to an opening plane. The retainer for the sensor carrier advantageously serves simultaneously as a closure for the opening in the housing of the toggle clamping apparatus, for introduction of the detection unit. Closing of the opening consequently takes place by means of a movement perpendicular to the opening or to a plane spanned by the opening. Previously, the sensor carrier is introduced into the housing through the opening and pivoted by about 900 during this process, so that it is oriented parallel to the piston rod. This pivoting process is made possible by means of the articulated mounting of the sensor carrier in the retainer of the detection unit. In this regard, the direction of the pivot axis is oriented approximately perpendicular to the direction of the piston rod. Consequently, the entire detection unit can easily be removed, replaced, and put into place again.

Possible shut-down times of the line in motor vehicle production are thereby reduced to a minimum.

[A3] In an embodiment of the detection unit, it is provided that it has at least two dimensional reference surfaces that are oriented orthogonal to one another and oriented parallel to the pivot axis. In order to ensure that the end positions of the piston in the cylinder or of the clamping arm of the toggle clamping apparatus do not have to be reset after replacement of the detection unit, the dimensional reference surfaces of the retainer ensure great reproducibility even after repeated installation processes. In this regard, one dimensional reference surface establishes the distance of the pivot axis from the housing surface of the toggle clamping apparatus, while the other dimensional reference surface establishes the position of the pivot axis in the axial direction of the piston rod. By means of suitable matching processes, it is possible to do without adjustment procedures entirely, even after replacement of the detection unit.

[A4] If the at least one sensor carrier is configured to be flexible in a plane directed transverse to the pivot axis and is configured to be rigid in a plane directed parallel to the pivot axis, redirection of the sensor carrier is also possible at smaller movement radii. The sensor carrier can therefore be elastically bent or pivoted.

[A5] This behavior is achieved, in a further advantageous embodiment, in that the sensor carrier is configured as a link chain having link joint axes parallel to the pivot axis.

[A6] Alternatively to this, it is also possible, in another embodiment, that the sensor carrier is configured as a flat strip, particularly consisting of a steel strip. Because of the slight thickness of the flat strip, it has a lower resistance moment in the thickness direction than transverse to it. Consequently, the flat strip is flexible in the thickness direction, in other words pliable, and rigid transverse to that direction, because it has a greater resistance moment in its width.

[A7] In a further advantageous embodiment, it is provided that the flat strip is configured to be vaulted. Because of the vaulting, it behaves rigidly also in the thickness direction. The installation position of the toggle clamping apparatus thereby does not influence the precision of sensor positioning. Gravitational forces therefore cannot lead to imprecisions at the switching points, as the result of the inherent weight of the sensor carrier.

[A8] If the sensor carrier has at least one guide part, particularly at its free end, guided pivoting of the sensor carrier in the housing can also take place when the sensor carrier is pivoted into the housing of the toggle clamping apparatus; this improves the position precision of a sensor affixed to the sensor carrier.

[A9] The measure that at least one sensor is attached to the sensor carrier, particularly attached in longitudinally displaceable manner, makes it possible to produce large numbers of units, and to establish the precise position of the sensor only at delivery, for example.

[A10] If the retainer has at least one attachment bore and an electrical feed, which is preferably configured as a side of a plug connection, no complicated wiring of the detection unit is necessary after replacement, either.

[A11] The retainers can advantageously also take on additional functions, if the retainer has a cavity for accommodation of a board and/or transparent openings for display of a switching state.

[A12] The technical production effort can be further advantageously reduced by means of the measure that the sensor carrier is configured as a flexible circuit board.

[A13] The task is also accomplished by means of a method for installation of a detection unit through an opening of a housing, for detection of parts that are translationally moved in the housing, particularly for a toggle clamping apparatus, preferably for use in vehicle body construction in the motor vehicle industry, in which method, for installation, at least one sensor carrier is connected with a retainer so as to pivot about a pivot axis, and the at least one sensor carrier is pushed into a cavity of the housing and the retainer is inserted into the opening, fitting into it, perpendicular to a plane of the opening, and thereby closes the opening. After installation of the detection unit, the installation opening is therefore advantageously closed completely. The circumferential join in the opening is sealed by the retainer, so that contamination of the housing interior of the toggle clamping apparatus does not have to be feared.

[A14] In an embodiment of the method, it is provided that when the sensor carrier is pushed into the cavity, the sensor carrier is elastically bent in a plane. By means of this elastic bending, the sensor carrier can also be pushed into the housing about relatively tight radii.

A preferred embodiment of the invention will be explained as an example, using a drawing.

The figures of the drawing show, in detail:

FIG. 1 a section through the installation situation of the detection unit according to the invention in a toggle clamping apparatus, FIG. 2 a perspective side view of the detection unit, FIG. 3 a perspective top view of the detection unit according to the invention, FIG. 4 a perspective view of the detection unit according to the invention from below, and FIG. 5 an alternative embodiment of the detection unit according to the invention as a perspective view from below.

In FIG. 1, the detail of a clamping head is shown in section, so that the installation situation of the detection unit 1 is evident. In this regard, it is presumed to be known how a toggle clamping apparatus is designed and how its clamping head is structured. In the housing 32 of the clamping head 34, an opening 33 is introduced for installation of the detection unit 1, into which opening the retainer 2 is inserted. In the retainer 2, a sensor carrier 3 that can pivot about the pivot axis 4 is mounted so as to rotate. In this regard, a sensor is provided in the retainer 2, and a further sensor 7 is provided in the guide part 15, which is attached to a free end 16 of the carrier 3. A cable 31 is provided for supplying power and passing the signal of sensor 7 on, which cable runs above the sensor carrier 3.

A cavity 25 is situated between the wall of the housing 32 of the clamping head 34 and the clamping arm 26 disposed in the clamping head or the piston rod 27 articulated onto it; this cavity accommodates the sensor carrier 3 of the detection device 1. In the installed state, the sensor carrier consequently has approximately the same direction as the movement direction 5 of the piston rod 27 or of the clamping arm 26.

In order for the sensors 7 to always assume the same position after installation or replacement of the detection device 1, the retainer 2 has a dimensional reference surface 9 that is configured as a stop and is oriented parallel to the opening plane 8 of the opening 33. In order for the position in a plane disposed orthogonal to this to also be fixed in place, a second dimensional reference surface 10 is formed on the retainer 2, which surface is also disposed orthogonal to the dimensional reference surface 9. The matching surfaces that interact with one another are indicated with triangles in FIG. 1. In this manner, the pivot axis 4 is fixed in space, and with it also the position of the detection device 1, which is exchangeable as an assembly unit, called a detection cassette 6.

Figure 2:
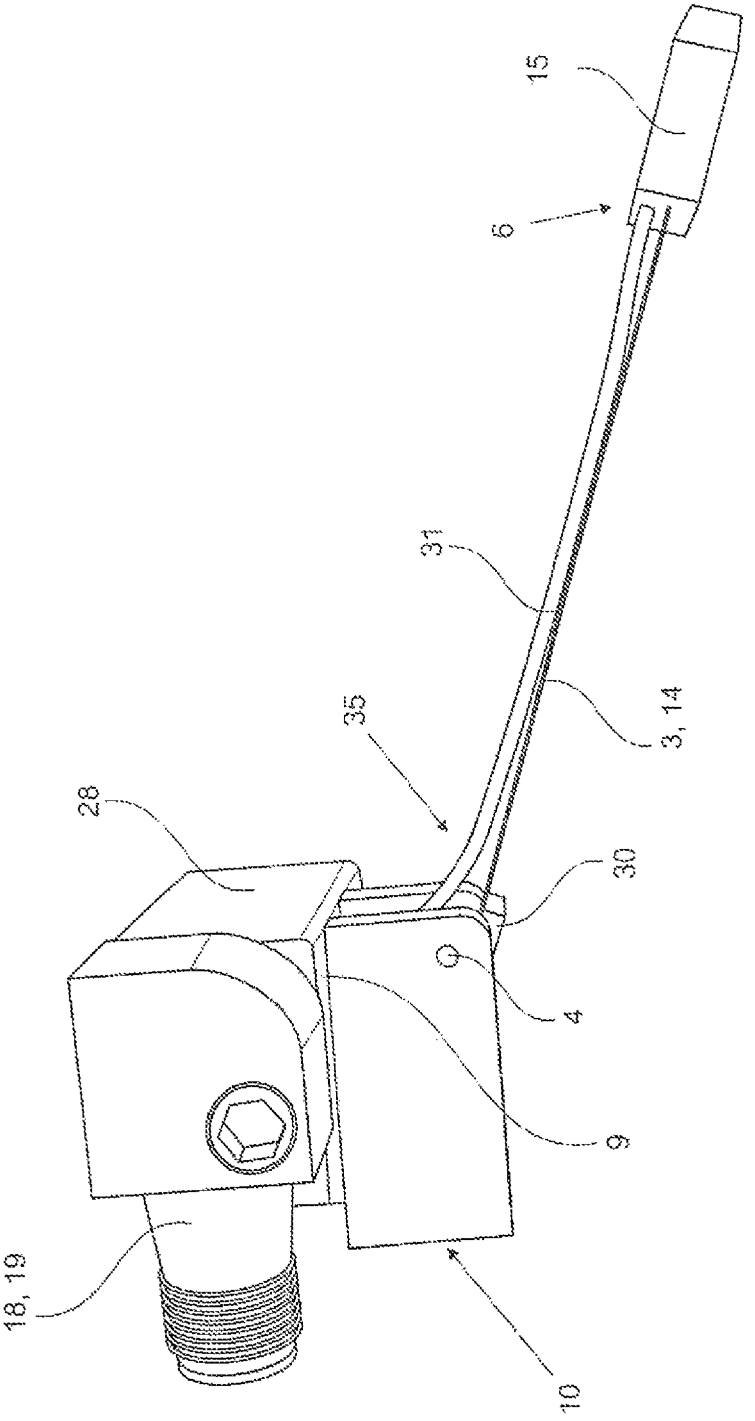
Figure 3:
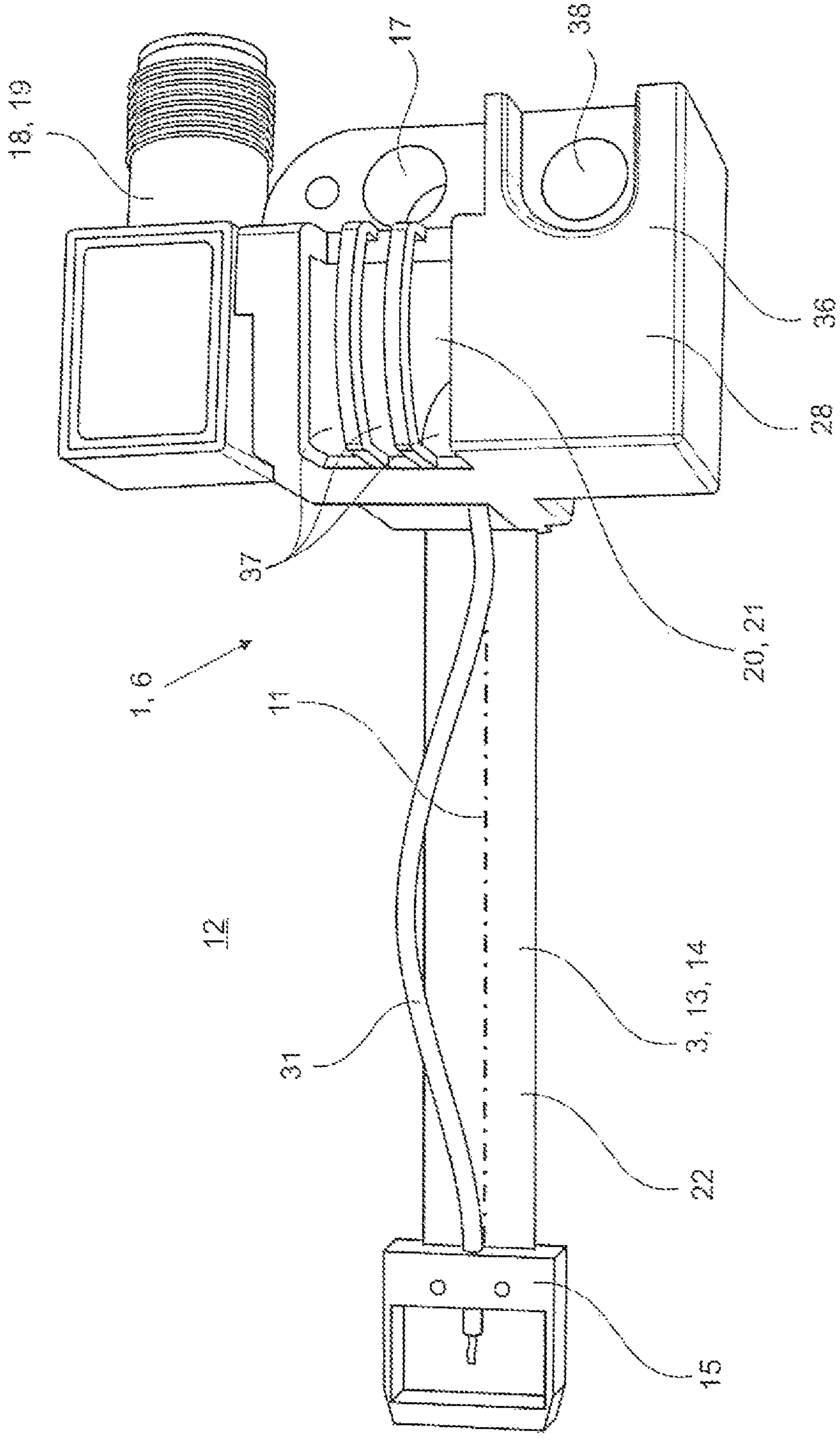
Figure 4:
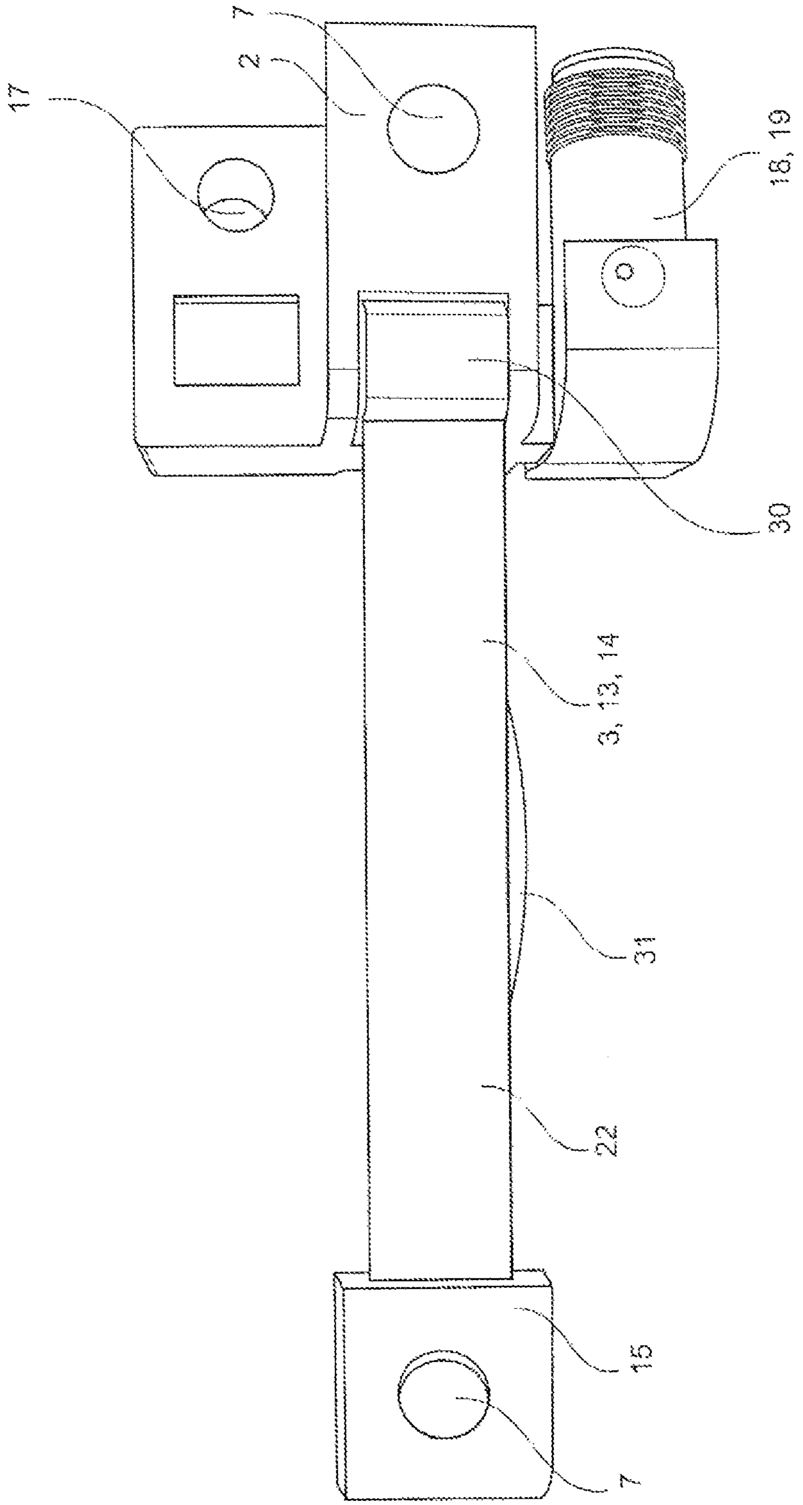

FIGS. 2 to 4 show the detection unit according to the invention in perspective views, from different directions. In the side view according to FIG. 2, the dimensional reference surfaces 9 and 10, in particular, can be seen, as can a socket 30 that can pivot, through which the pivot axis 4 passes, and into which the sensor carrier 3 is clamped at its mounted end 35. The other end 6 is clamped in the guide part 15. A plug connection 19 is provided for a connection with the over-riding controller, on the housing 28 of the detection unit 1. The sensor carrier 3 is a steel strip having a slight thickness, so that it behaves in flexible, elastically deformable manner in the drawing plane. Transverse to this, in other words perpendicular to the drawing plane, the sensor carrier 3 acts in rigid manner.

In the top view according to FIG. 3, a cavity 20 can be seen on the housing 28 of the detection unit 1; the electronics for supplying the sensors 7 are installed on a board 21 in this cavity, and the cable 31 to the sensor 7 provided in the guide part 15 is also guided from this board. In the lid 36 of the housing 28, the transparent openings 37 serve to be able to recognize the switching state of the detection unit. For this purpose, visible light-emitting diodes are disposed on the board 21 and display the switching state. A screw 38 is sufficient for attaching the lid 36. A passage bore 17 serves to attach the detection device 1 on the housing 32 of the clamping head 34. The plane that stands perpendicular to the drawing plane is indicated with 11; in this plane, the sensor carrier 3 behaves flexibly. In the drawing plane 12, it behaves rigidly.

FIG. 4 shows a perspective view of the detection unit according to the invention from below. In this view, the sensors 7 are particularly evident; one of them is disposed in the guide part 15 and the other in the retainer 2.

Figure 5:
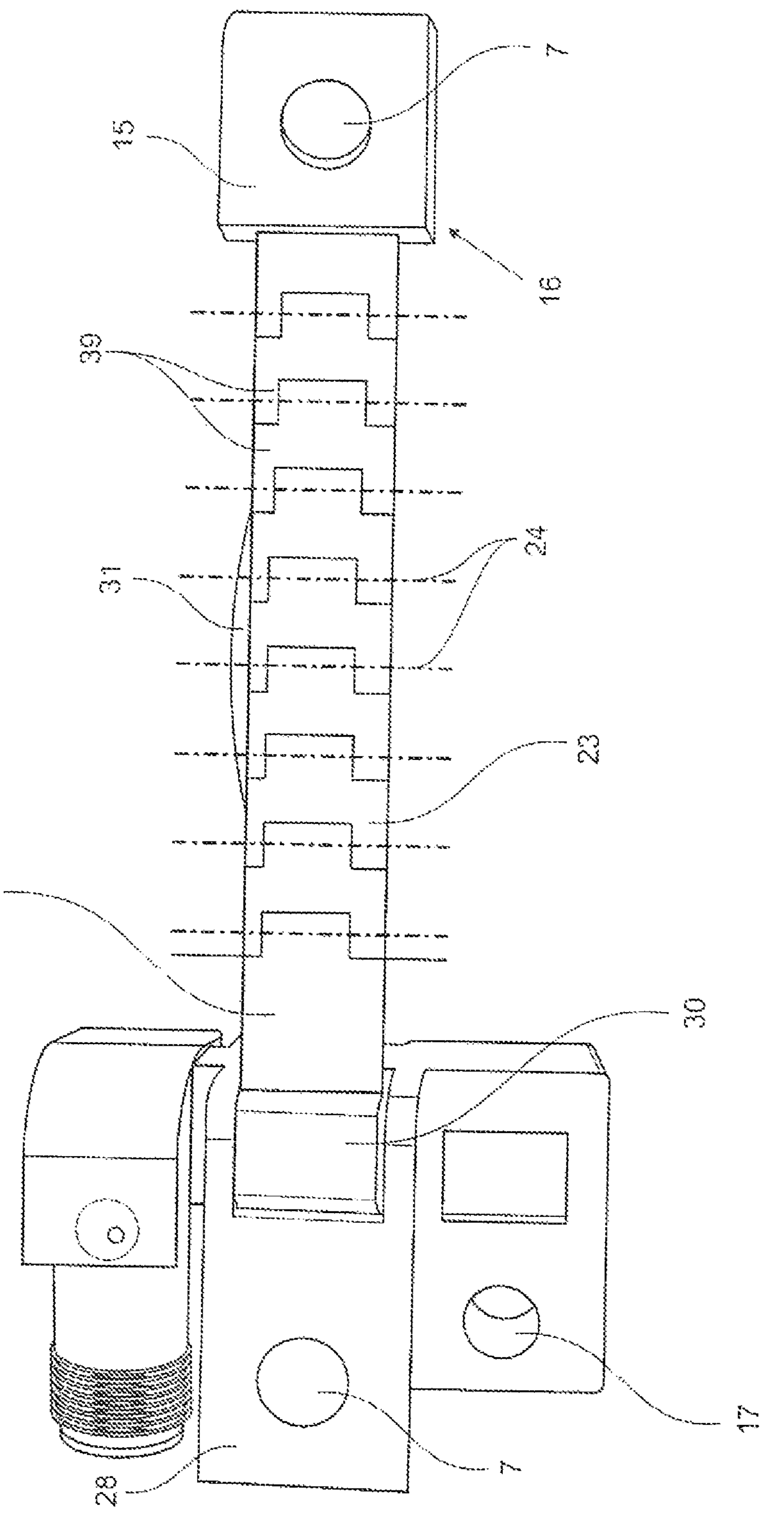

FIG. 5 also shows a detection unit from below, in a perspective view, in which the sensor carrier 3 is not configured as a flat strip 13, as shown in FIGS. 3 and 4, but rather implemented by means of a chain of links 39 that are lined up with one another. These therefore form a link chain 23. Because of the parallel link joint axes 24, the sensor carrier 3 behaves flexibly in a plane perpendicular to the drawing plane, while it behaves rigidly again in the drawing plane.

While at least one exemplary embodiment has been presented in the abstract indicated above and the preceding detailed description, it should be understood and stated that a great number of variations or modifications of it exist. It should also be stated that the exemplary embodiment or the exemplary embodiments are only examples and are not intended to restrict the scope (or scope of protection), the applicability or the structure of the device according to the invention in any way. Instead, the abstract and the detailed description give a person skilled in the art sufficient and easily understood instructions for implementation of at least one exemplary embodiment. In this regard, it should be understood that varied and diverse modifications of this embodiment can be made, with regard to the function and the placement of the elements described in an exemplary embodiment, without deviating from the scope (or scope of protection) defined by the attached claims and their legal equivalents.

REFERENCE SYMBOL LIST

1 detection device
2 retainer
3 sensor carrier
4 pivot axis
5 direction
6 detection cassette
7 sensor
8 opening plane
9 dimensional reference surface
10 dimensional reference surface
11 plane
12 plane
13 flat strip
14 steel strip
15 guide part
16 end
17 attachment bore
18 feed
19 plug connection
20 cavity
21 board
22 circuit board
23 link chain
24 link joint axes
25 cavity (toggle clamping apparatus)
26 clamping arm
27 piston rod
28 housing (detection unit)
29 guide groove
30 socket
31 cable
32 housing (clamping head)
33 opening
34 clamping head
35 end
36 lid
37 openings
38 screw
39 link

The invention claimed is:

1. An assembly comprising a clamping head and a detection unit for detection of end positions of the clamping head, the clamping head comprising a space and an opening and the detection unit comprising end switches or positioners comprising micro-switches, inductive switches, pneumatic switches or sensors, which are integrated into the space of the clamping head that is accessible through the opening, and are attached to a retainer that forms a cover for the opening, as a detection cassette comprising a housing and a plug connection on the housing that is exchangeable as a whole, and wherein the retainer is connected with at least one flexible sensor carrier, wherein the at least one flexible sensor carrier is connected with the retainer and mounted so as to pivot about a pivot axis of the retainer, and wherein the pivot axis is oriented parallel to a dimensional reference surface of the retainer.

2. The assembly according to claim 1, wherein the detection unit has at least two dimensional reference surfaces that are oriented orthogonal to one another and are oriented parallel to the pivot axis.

3. The assembly according to claim 1, wherein the at least one flexible sensor carrier is configured to be flexible in a first plane directed transverse to the pivot axis and configured to be rigid in a second plane directed parallel to the pivot axis.

4. The assembly according to claim 1, wherein the at least one flexible sensor carrier is produced from a flat strip.

5. The assembly according to claim 4, wherein the flat strip is configured to be vaulted.

6. The assembly according to claim 1, wherein the at least one flexible sensor carrier has at least one guide part.

7. The assembly according to claim 1, wherein the at least one flexible sensor is attached to the sensor carrier.

8. The assembly according to claim 1, wherein the retainer has at least one attachment bore and an electrical feed that is configured as one side of the plug connection.

9. The assembly according to claim 1, wherein the retainer has a cavity for accommodation of a board and/or transparent openings for display of a switching state.

10. The assembly according to claim 1, wherein the at least one flexible sensor carrier is configured as a flexible circuit board.

* * * * *